United States Patent

[11] 3,587,290

[72] Inventors George D. Beauchamp;
James M. Ware, Port Arthur, Tex.
[21] Appl. No. 859,051
[22] Filed Sept. 18, 1969
[45] Patented June 28, 1971
[73] Assignee Texas—U.S. Chemical Company,
Parsippany, N.J.

[54] TEST APPARATUS FOR PROCESS COMPUTER INTERFACE INSTRUMENTATION
6 Claims, 4 Drawing Figs.

[52] U.S. Cl.................................................. 73/1R, 73/4
[51] Int. Cl. ...................................................G01n 18/00, G05b 23/00
[50] Field of Search............................................ 73/1 (A), 4, 420; 137/MA (Inquired)

[56] References Cited
UNITED STATES PATENTS

| | | | |
|---|---|---|---|
| 719,968 | 2/1903 | Wood............................ | 73/4 |
| 3,025,868 | 3/1962 | Jaquith......................... | 137/MA |
| 3,381,516 | 5/1968 | Maples.......................... | 73/1(A) |

Primary Examiner—S. Clement Swisher
Attorneys—Bertram H. Mann, Frank B. Pugsley, James G. Ulmer, Delmar L. Sroufe and Larry B. Feldcamp ABSTRACT: A control loop interface between a digital computer and a pneumatically operated regulator for an industrial process variable includes various converters in the computer output and feedback circuits and the pneumatic piping. Cutoff valves and manometer connections are provided in the piping between each converter and the regulator, and connectors are provided in the computer output and feedback wiring so that each instrument may be isolated from the system, while coincidentally locking the regulator in the operating condition of the moment. Suitable test instrumentation is then applied to the connectors for indicating the operation of the particular segregated instrument. Preferably, the various pneumatic couplings, electrical connectors, and valve actuators are provided on a conveniently located test panel. Where a multiplicity of variables are computer controlled, as is usually the case, all of the test panels will be conveniently grouped so that a relatively unskilled workman can test all of the interface instruments in a relatively short time.

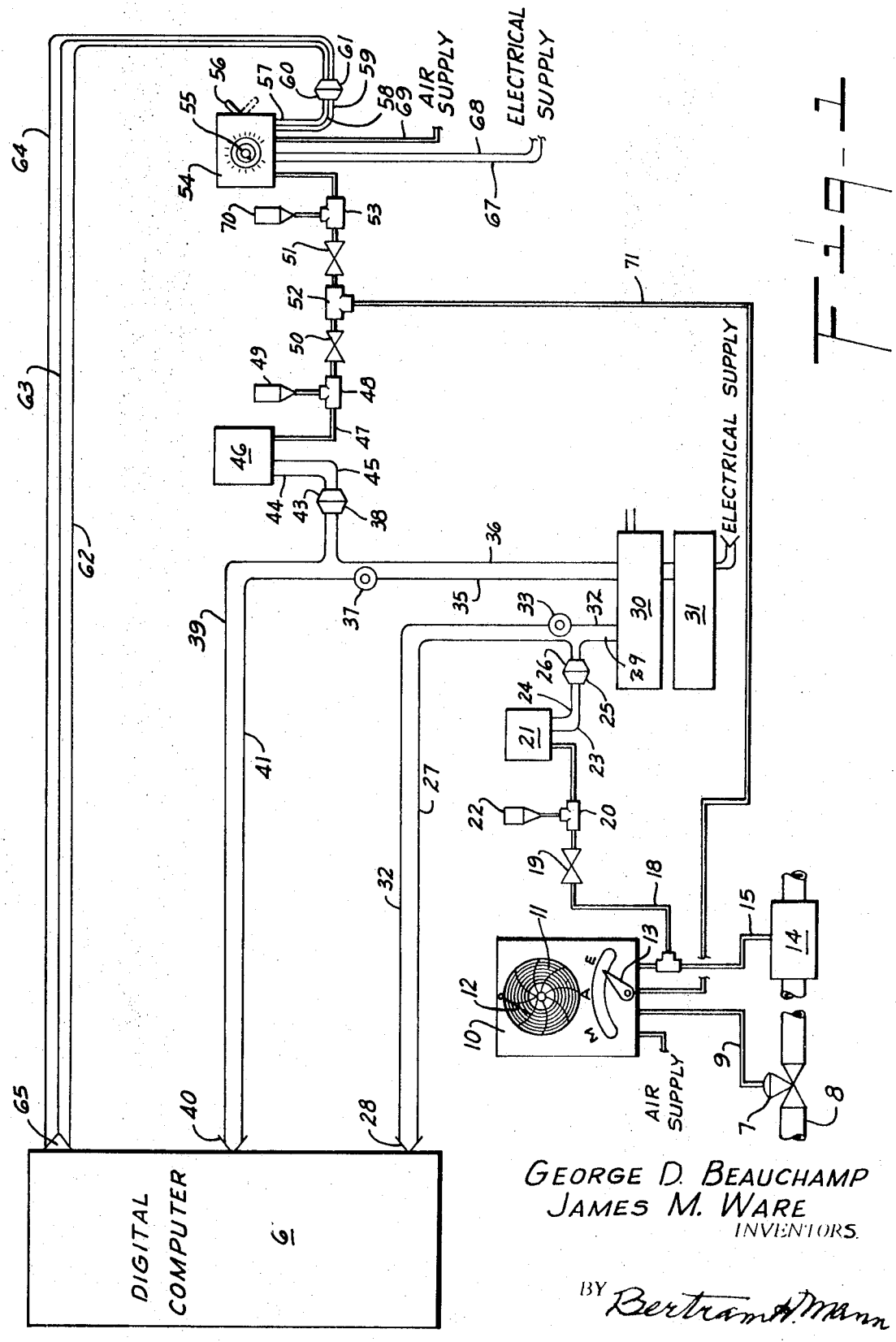

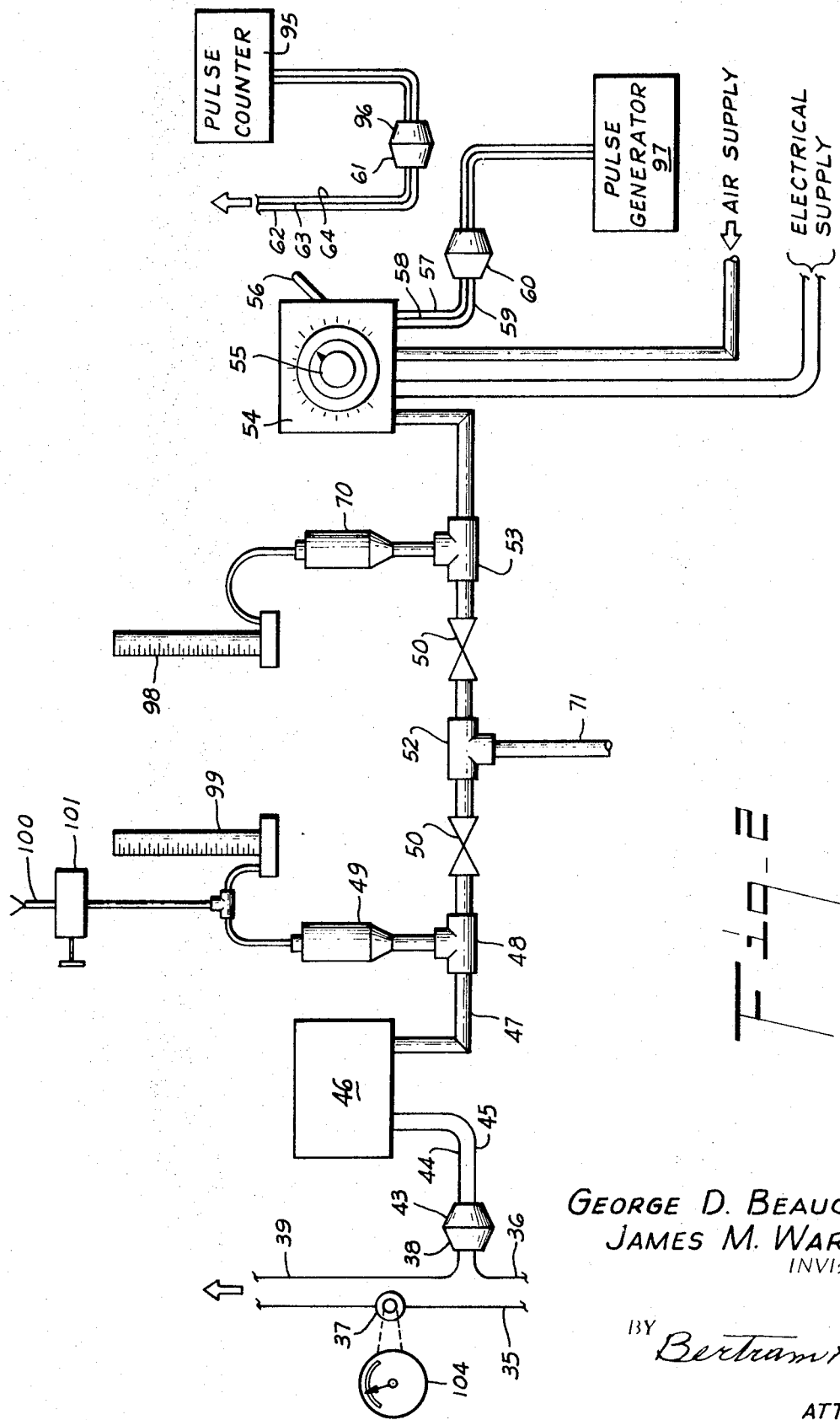

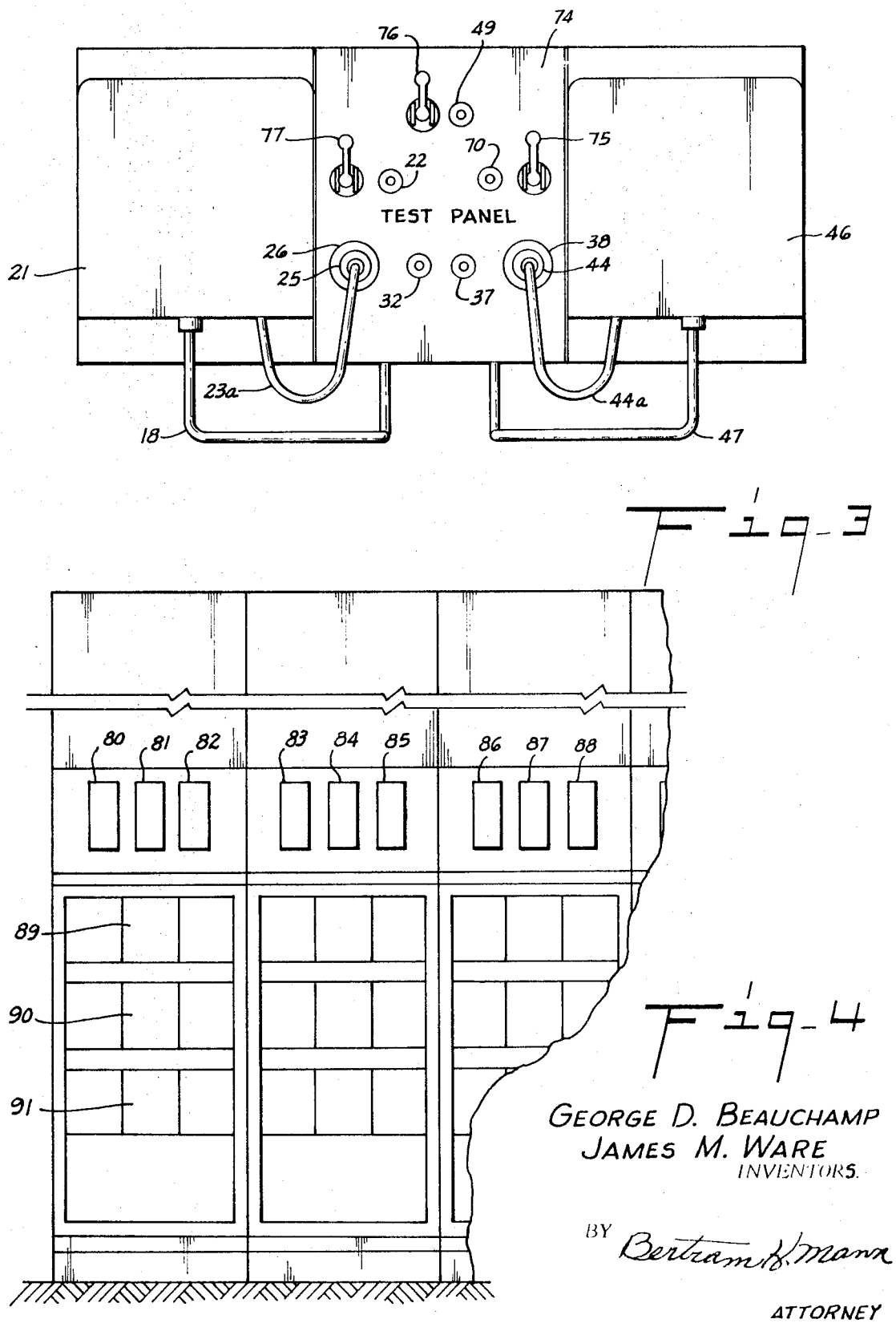

TEST APPARATUS FOR PROCESS COMPUTER INTERFACE INSTRUMENTATION

BACKGROUND OF THE INVENTION

1. Field of the Invention

This invention relates to computer control of industrial processes and consists particularly in novel test means for the instruments of the process-computer interface.

2. Description of the Prior Art

Where a multiplicity of variables in an industrial process, such as flow rates, temperatures, pressures, liquid levels, and the like, are controlled from a digital computer, it is, of course, necessary to incorporate suitable interface instrumentation in the control for translating the computer signals, for instance, digital pulses, to a form of energy to which the variable regulators are adapted. Feedbacks are provided as is necessary in automatic process controls. It is essential in such control that all instrumentation be functioning accurately, and accordingly it has been customary, from time to time, to shut down the process while removing one or more of the instruments for tests and/or repair or replacement. Such shutdowns, even for short periods, are very undesirable, particularly in continuous processes. Moreover, such test procedure requires the use of relatively skilled instrument personnel and, especially in the case of processes having a considerable number of regulated variables, is very time consuming and therefore expensive.

SUMMARY OF THE INVENTION

In accordance with the present invention, means are provided in association with each interface instrument for isolating the same from the remainder of the system and for connecting thereto suitable test instrumentation without the necessity of stopping the functioning of the process variable or removing the instrument from its operative mounting. Furthermore, no instrument involves more than two control lines, so that the proper coordination of such lines is greatly simplified over previous situations wherein three input and output variables may have to be coordinated in connection with a particular instrument, a test procedure which is particularly difficult where linear response is desired. In order to achieve this advantage, a separate transducer (pressure-to-current converter) is inserted in the feedback line between the computer and the pneumatic piping connecting the main pulse-to-pneumatic converter with the regulator. Also, to insure greater accuracy of control, separate feedback lines are provided from a sensor of the controlled variable and the primary pulse-to-pressure converter.

BRIEF DESCRIPTION OF THE DRAWINGS

FIG. 1 is a schematic representation of an interface loop between a digital computer and the regulator for a variable of an industrial process, in this case, a fluid flow rate.

FIG. 2 shows a portion of FIG. 1 with test instruments applied.

FIG. 3 is an elevation showing a test panel for one interface loop.

FIG. 4 shows schematically a portion of the control and test panelling provided in connection with a chemical process.

DESCRIPTION OF THE PREFERRED EMBODIMENTS

FIG. 1 shows the various parts of a control interface between a digital computer 6 and a motorized regulator 7 for controlling the flow rate of a fluid through a process pipe 8. The present invention has been advantageously used in connection with the manufacture of synthetic rubber, and in such chemical process a great number of variables must be interrelatedly controlled. The digital computer has been found to constitute a highly efficient means for such purpose.

Motorized regulator 7 is herein shown as pneumatic and is connected by a pneumatic line 9 to an indicator and controller instrument 10 having a rotating dial 11 with a pivoted scribing needle 12 which visually indicates and records the performance of the particular controlled variable. An arm 13 may be rotated to positions marked "M" for manual control, "A" for automatic, and "E" for external set point control. In the manual position of lever 13, the regulator is locked in the position of the moment. In the automatic position, the regulator is controlled from a variable sensor 14 and pneumatic line 15 also leading to instrument 10 to maintain the variable at an adjusted value. Sensor 14 incorporates suitable well-known means for responding to the rate of flow through piping 8.

Piping 18 leads through a manual valve 19 and a coupling 20 to a pressure-to-current converter 21. A quick connect tubing fitting 22 is provided at coupling 20 for a purpose to be described. The fitting is of the type which automatically closes when it is not in use. A pair of wires 23 and 24 extend from converter 21 to a male connector plug 25. A female connector plug 26 normally is coupled with plug 25 and connected by an electrical wire 27 to a feedback connection 28 on digital computer 6 and by a second wire 29 to a distribution panel 30 for distributing electrical energy from DC power supply 31 to the various interface loops provided for the different process regulator controls. An electrical wire 32 completes the circuit from panel 30 through a series-type electrical connector or jack 33, for instance, an Amphenol-type connector, to the previously mentioned feedback connection 28 of the computer.

Another pair of wires 35 and 36 extend from the distribution panel, respectively, through a second electrical connector or jack 37 and to female electrical connector plug 38, the latter also being connected by a wire 39 to a second feedback connection 40 of the computer. Connector or jack 37 is connected to the same feedback connection 40 by means of a wire 41. Male connector plug 43 is connected by wires 44 and 45 to a pressure-to-current converter instrument 46.

Instrument 46 is connected by pneumatic piping 47 through a coupling 48 provided with a quick connect fitting 49, a pair of valves 50 and 51, and a pair of couplings 52 and 53 to a pulse-to-pneumatic converter instrument 54. This latter instrument constitutes a set point station for regulator 7 and has rotatable dials 55 for visually indicating the response of the instrument to digital stimuli received from the computer. Dials 55 also serve for setting the regulator and its limits. Instrument 54 is also provided with a lever 56 which has positions designated "Comp." (computer) and "Manual." In the "Manual" position, instrument 54 may be manually adjusted to provide a pneumatic pressure norm and limits for external operation of regulator 7. Three wires 57, 58, and 59 lead from instrument 54 to a male electrical connector 60 which is normally coupled with a female connector 61 in turn connected by three wires 62, 63, and 64 to the pulse output connection 65 of computer 6.

A pair of wires 67 and 68 connect instrument 54 to an electrical power supply while piping 69 connects this latter instrument to an air supply. Piping coupling 53 is provided with a quick connect fitting 70. Piping coupling 52 is connected by tubing 71 to control instrument 10 previously mentioned.

FIG. 3 shows a test panel 74 having most of the pneumatic couplings and electrical connectors mounted therein and is itself conveniently disposed between pressure-to-current instruments 21 and 46. Wires 23 and 24 from instrument 21 (FIG. 1) extend through a cable 23a to male connector 25 which is normally plugged into female connector 26 mounted in the panel. Similarly, wires 44 and 45 extend in a cable 44a from instrument 46 to male coupling 44 normally plugged into female coupling 38 in the panel. The Amphenol, series-type electrical connectors are shown on the panel at 32 and 37. Levers 75, 76, and 77, respectively, operate valves 51, 50, and 19. Also mounted in the panel are quick connect pneumatic fittings 70, 49, and 22.

FIG. 4 illustrates several set point stations at 80—88, inclusive, arranged upon a wall of the control room. Directly beneath each set of three such stations are the test panels, as at 89, 90, and 91, for the control loop embodying the set point stations directly thereabove.

FIG. 2 shows a portion of the interface loop of FIG. 1 with various test instruments interposed in the circuitry. Preferably, however, the instruments will be tested one at a time and, as previously stated, without the necessity of removing the particular instrument from the installation or of stopping the process. Electrical connector plugs 60 and 61 have been separated and a pulse counter 95 applied by means of its male connector 96 to female connector 61. Thus, digital pulses from the computer may be checked and, if valve 51 has been closed previously, as will be explained, the controlled process will not be interrupted. Also, upon separation of connector plugs 60 and 61, a pulse generator 97 may be connected to male connector plug 60, as shown. This will enable controlled pulses to be applied to instrument 54. With a manometer 98 connected at 70, the effects of such controlled pulsing of instrument 54 may be checked. A manometer 99, also, may be applied at quick connect fitting 49. If a pneumatic pressure source 100 is connected to the manometer with a regulator 101, the effect of controlled pressure on instrument 46 may be checked. Finally, FIG. 2 also shows a milliammeter 104 plugged into series-type connection 37 so as to register the current passing through wire 35, 41. This enables the measurement of the effect of controlled pressure applied to pressure-to-current converter instrument 46. With further reference to FIG. 1, a manometer of the type shown at 99 also may be applied to quick piping fitting 22 and a milliammeter as 104 connected to series electrical connector 33.

In operation of the test equipment, in order to check the output pulsing produced under controlled conditions by the computer, valve 51 will be closed. This will have the effect of maintaining controller instrument 10 at the particular fixed pressure of the moment and, accordingly, regulator 7 and sensor 14 will operate automatically to maintain the flow in pipe 8 at the instantaneous rate. With electrical connectors 60, 61 disconnected, the pulse counter 95 will be applied to connector 61 to obtain the reading desired. Also, with valve 51 closed, pulse generator 97 may be connected to connector plug 60 and manometer 98 connected at 70 for reading the effect on pulse-to-pneumatic converter instrument 54 of controlled pulses. Of course, instrument 54 need not be removed from the line to make this test and, at the conclusion thereof, connector plugs 60 and 61 will be reconnected and manometer 98 removed from quick connect tubing fitting 70 prior to opening of valve 51 to resume normal digital operation of the regulated variable.

With valve 50 closed, the regulator will operate temporarily without feedback means 46, 41, etc. Under this condition, a controlled pressure manometer 99 may be applied to tubing fitting 49 and a milliammeter 104 inserted in series connector 37 for registering the effect of controlled pressure upon pressure-to-current converter instrument 46. Again, it is not necessary to remove instrument 46 from the system and, as in all test cases mentioned, test instruments are simply plugged into the corresponding test panel—for instance, 74 in FIG. 3. In the present instance, means have not been provided on the panel itself for opening connector plug 60, 61 and inserting pulse counter 95 and/or pulse generator 97. However, such features may be added to the test board if desired.

With valve 19 closed by means of lever 72 on the test panel, a regulated pressure manometer, as at 49, may be applied to quick connect tubing fitting 22 and a milliammeter applied to series connection 33 for registering the effect on pressure-to-current converter 21 of controlled pressures. Cooperating connector plugs 25, 26 and 38, 43 are provided to facilitate location of the milliammeter connectors 32 and 37 on the test panel.

The provision of the extra pressure-to-current converter 46 is of special significance in that it prevents the necessity of correlating three input and output parameters connected to pulse-to-pneumatic converter instrument 54, namely, pulses from computer 6, air pressure to controller 10, and the feedback through wires 41 to the computer. On the contrary, instrument 54, in the present loop arrangement, need be checked only with respect to the effect of digital pulses upon the output pressure in line 71, while the accuracy of instrument 46 may be separately tested.

Another advantage of the loop controller shown results from the provision of two feedbacks to the computer, namely, the feedback from pneumatic piping 71, 47 and wires 41, 39 in addition to the direct feedback from variable sensor 14 through piping 15, 18 and wires 27 and 32. The extra feedback increases the feasibility of the computer control.

In one plant wherein the present invention has been used, a synthetic rubber manufacturing process involved the use of approximately 50 set point controllers, as at 80—88. The checking of the interface instruments was so simplified and expedited by the use of the invention that less skilled help was able to make the tests in perhaps one-tenth of the time previously required wherein it was necessary to go into a different room from the location of the controller to open up pneumatic and electrical lines for cutting out the instrumentality to be checked. Furthermore, the process had to be shut down during such testing. Alternatively, the process could be continued during the long test period only at fixed regulation of the particular variable being checked. Moreover, no special tools or equipment are needed in making tests with the novel test apparatus, other than the test instruments themselves.

The invention may be modified in various respects as will occur to those skilled in the art. Obviously, the invention can be applied to a wide variety of industrial processes in order to expedite and simplify the testing thereof.

We claim:

1. An industrial process control system including a pneumatic regulator and a sensor for a process variable, a digital computer, a first, digital pulse-to-pneumatic converter, second and third, pneumatic-to-electrical energy converters, output wires between said computer and said first converter and feedback wires between said computer and said second and third converters, pneumatic piping between said first and second converters and said regulator and between said third converter and said sensor, first, second, and third cutoff valves in said piping, respectively, between said first and second converters and said regulator and between said third converter and said sensor, a coupling in said piping between each of said converters and the associated cutoff valve, a pressure sensing instrument constructed and arranged for connection in each of said couplings, connectors in said wires each between said computer and one of said converters, and electrical energy sensing instrumentation for application selectively to said connectors to register the effects on said converters of controlled pressures applied thereto independently of said regulator.

2. A process control as defined in claim 1 wherein said couplings, at least the connectors between said computer and said second and third converters, and actuators for said valves are located on a conveniently located test panel.

3. The combination with an industrial process control system including a motorized regulator and a sensor for a process variable, a process controlling computer having a programmed output, first transmission means connecting said computer output to said regulator, including a first energy converter, and feedback transmission means connecting said sensor to said computer and including a second energy converter, of control system test means comprising a first coupling and a first cutoff located serially in said first transmission means between said first converter and said regulator, a second coupling and a second cutoff located serially in said feedback transmission means between said sensor and said second converter, and energy sensing instrumentation for application, selectively, to said couplings to register the response of each of said converters to controlled energy applied thereto.

4. The combination described in claim 3 in which said process control system also includes second feedback transmission means connecting said first converter to said computer and including a third energy converter, said test means further including a third coupling and a third cutoff serially arranged in said second feedback transmission, and energy sensing instrumentation for application to said third coupling to register the response of said third energy converter to control energy applied thereto.

5. A control system as described in claim 3 further including a third coupling in said computer output and means for disconnecting said third coupling and for applying known energy to said third coupling for testing the response of said first converter thereto.

6. A control system as described in claim 4 further including means for applying known energy to said third converter upon closing of said third cutoff to test the response of said third converter thereto.